May 26, 1931. J. C. CROWLEY 1,807,282
SEED DISTRIBUTING ATTACHMENT FOR PLANTERS
Filed Sept. 30, 1929
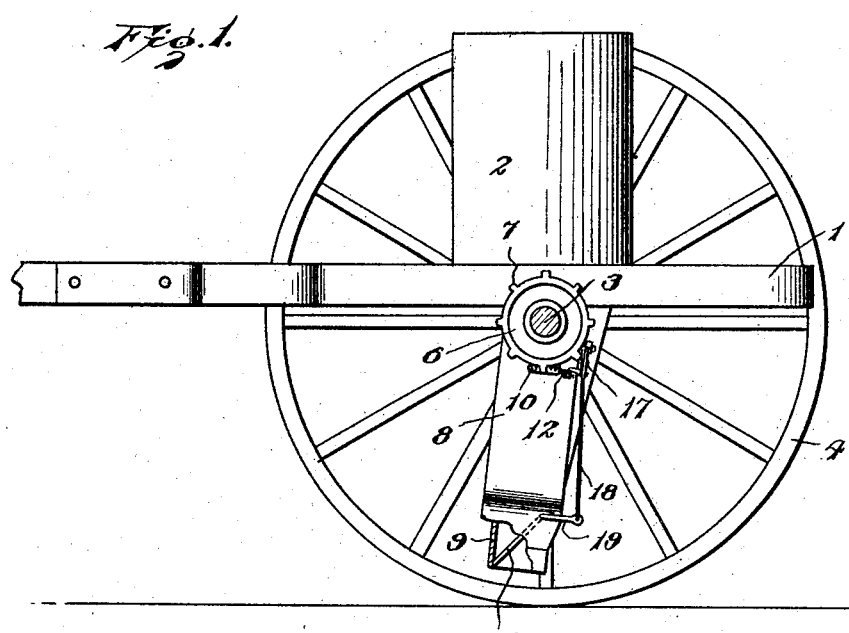
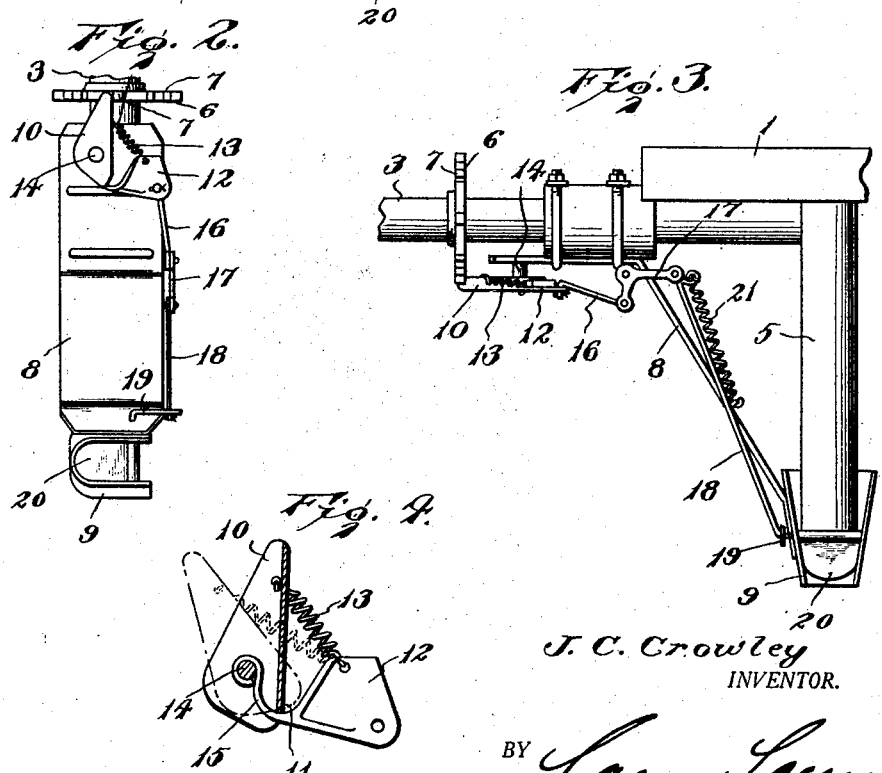
J. C. Crowley
INVENTOR.
BY *Lacey & Lacey*
ATTORNEYS Patented May 26, 1931

1,807,282

UNITED STATES PATENT OFFICE

JESSE C. CROWLEY, OF PARIS, TEXAS

SEED DISTRIBUTING ATTACHMENT FOR PLANTERS

Application filed September 30, 1929. Serial No. 396,372.

This invention is a seed distributing attachment for cotton planters and has for its object the provision of simple and inexpensive means whereby the seed will be planted in hills at regular intervals and will thereby render unnecessary the use of a cotton chopper after the seed germinates and plants appear above the surface of the ground. The invention is illustrated in the accompanying drawings and consists in certain novel features which will be hereinafter first fully described and then more particularly defined in the appended claims.

In the drawings:

Figure 1 is a side elevation of a planter having a seed distributing attachment embodying the invention mounted thereon, the near wheel of the planter being removed and some parts being shown in section.

Figure 2 is a bottom plan view of the seed depositing mechanism.

Figure 3 is a rear elevation of the same.

Figure 4 is an enlarged detail section.

Referring to the drawings, the numeral 1 designates a planter frame upon which is mounted a seed hopper 2 and an axle 3 to which are secured ground wheels 4. A seed spout 5 communicates directly with the hopper 2 and extends therefrom to a point near the surface of the ground so that the seed will be directed to the desired point and not be scattered broadcast. In carrying out the present invention, a wheel 6 having spaced lugs 7 upon its periphery is secured to the axle 3 at one side of the frame and to the frame at the inner side of said wheel is secured a supplemental frame or bracket 8 which extends inwardly and then downwardly to be secured to the boot 9 at the lower end of the spout as shown most clearly in Figure 3. Pivoted upon the frame 8 adjacent the wheel 6 is a lever 10 which has its outer end disposed in the path of the lugs 7 upon the wheel 6 so that as said wheel rotates the lever will be vibrated. Said lever 10 is of such form that an engaging shoulder 11 is formed adjacent the inner extremity thereof to engage an intermediate portion of the lever 12. It will be noted that this element is a lever of the third class.

A coil spring 13 is disposed between and has its ends attached to the levers 10 and 12 respectively, as shown in Figures 2 and 4, so that when the machine is moving forwardly the lever 10 will be actuated to impart motion to the lever 12 but when the machine is moved backwardly the lever may yield to the impact of the lugs 7 without actuating the lever 12. The two levers have a common pivot indicated at 14, upon the under side of the frame 8, and the lever 12 has an arcuate extension 15 which passes across the shoulder 11 of the lever 10 and terminates in an eye encircling the pivot stud or pin, as clearly shown in Figure 4. The levers 10 and 12 constitute two arms of a deformable bell crank lever fulcrumed at 14. These elements function as a conventional bell crank under force applied in one direction, but are deformable or collapsible in the opposite direction. That is, movement imparted to the element 10 in one direction will be transmitted through shoulder 11 to the element 12, but movement in the other direction, imparted to lever 10 upon reversal of the planter, will be absorbed by spring 13 and will not be transmitted to element 12. At the free end of the lever 12 there is pivoted a link 16, and said link has its inner end pivoted to the depending arm of bell crank lever 17 which is fulcrumed upon the frame 8 so as to oscillate in a vertical plane. The inner extremity of the bell crank lever is pivoted to the upper end of a link or connecting rod 18 which extends downwardly and is pivoted to a rearwardly extending crank 19 on a rock shaft which is mounted in and extends through the sides of the boot 9 and the lower end of the seed spout 5 to carry a valve or drop plate 20 which normally extends across the boot, as shown in Figure 1, so that the seed dropping through the seed spout will be caught and held thereby. A retractile spring 21, attached to the link 18 and the frame 8, as shown most clearly in Figure 3, yieldably holds the parts in the position of rest so that after the valve or drop plate 20 has been rocked to discharge seed it will be at once returned to its normal position to prevent the dropping of additional seed until the machine has progressed to a point where a second hill should be planted.

The operation will, it is thought, be readily understood. The seed may be fed from the hopper 2 into the seed spout through any well known mechanism and such mechanism has not been illustrated because it forms no part of the attachment constituting the present invention. As the machine is drawn along the line to be planted, the driving wheel 6 will be rotated by the axle 3 and the lugs 7 on said wheel will be successively brought into contact with the front edge of the lever 10. The engagement of a lug with the lever will rock the outer free end of the lever rearwardly so that the inner end or the shoulder 11 will be forced against the intermediate portion of lever 12 and will rock said lever inwardly. This movement will be imparted directly to the link 16 so that the bell crank lever 17 will be rocked and exert an upward pull upon the crank 19 through the connecting rod 18. The valve or dropping plate 20 will be thereby obviously rocked downwardly to discharge the seed therefrom and as the lug 7 clears the lever the spring 21 will immediately return the parts to the initial position. Should the machine be moved backwardly and a reverse rotation imparted to the wheel 6, the lugs 7 will impinge against the rear edge of the lever 10 and swing the outer free end thereof forwardly, no motion being imparted to the lever 12 but the spring 13 being distended so that as the lug clears the lever 10, it will be at once drawn back to its initial position. Consequently, the machine may be moved backward without dropping seed. The device is obviously simple and compact and may be applied to any existing planter at a slight cost while in operation it will be found highly efficient for the purpose for which it is designed.

Having thus described the invention, what is claimed is:

1. A seed distributing attachment for use with a cotton planter, said planter having a frame, wheels, and a rotatable axle, said attachment comprising a driving wheel adapted to be secured on said axle, a bracket adapted to be secured to said frame, a valved seed spout, a deformable bell crank lever pivoted on said bracket and having one arm thereof in a position to be rocked by said driving wheel, the other arm thereof carrying a link connected to an arm of a second bell crank lever, said second bell crank lever being pivoted to said bracket and having operative connections to said valved seed spout, and yieldable means tending to close said valved seed spout, said deformable bell crank lever having means preventing relative angular movement between its arms in one direction, and further having resilient means permitting angular movement between said arms in the other direction, whereby movement imparted by said driving wheel to one of said arms of said deformable bell crank lever in said first direction is transmitted to said other arm and to said valved seed spout, but movement imparted to said first mentioned arm in said other direction is absorbed by said resilient means and is not transmitted to said other arm and said valved seed spout.

2. A seed distributing attachment for use with a cotton planter, said planter having a frame, wheels, and a rotatable axle, said attachment comprising a driving wheel adapted to be secured on said axle, a bracket adapted to be secured to said frame, a valved seed spout, a deformable bell crank lever pivoted on said bracket and having one arm thereof in a position to be rocked by said driving wheel, the other arm thereof carrying a link connected to an arm of a second bell crank lever, said second bell crank lever being pivoted to said bracket and having operative connections to said valved seed spout, and yieldable means tending to close said valved seed spout, said deformable bell crank lever having one of its arms provided with an abutment limiting the relative angular movement between said arm and the other arm thereof in one direction, said deformable bell crank lever having a spring between the arms thereof tending to maintain said arms in abutting relation, but permitting relative angular movement therebetween in the opposite direction, whereby force imparted by said driving wheel to said arm in one direction is transmitted through said abutment to said other arm and to said valved seed spout, but force imparted thereto in the other direction causes relative angular movement by the said arms against the action of said spring and is not transmitted to said valved seed spout.

In testimony whereof I affix my signature.

JESSE C. CROWLEY. [L. S.]